(12) United States Patent
Haviv et al.

(10) Patent No.: US 10,740,287 B2
(45) Date of Patent: *Aug. 11, 2020

(54) SYSTEM AND METHOD OF MANAGING SERVICE ORIENTED DATA

(71) Applicant: Iguazio Systems Ltd., Herzlia (IL)

(72) Inventors: Yaron Haviv, Tel-Mond (IL); Ori Modai, Ramat-HaSharon (IL); Orit Nissan-Messing, Hod-HaSharon (IL)

(73) Assignee: Iguazio Systems Ltd., Herzliya (IL)

(*) Notice: Subject to any disclaimer, the term of this patent is extended or adjusted under 35 U.S.C. 154(b) by 423 days.

This patent is subject to a terminal disclaimer.

(21) Appl. No.: 14/987,879

(22) Filed: Jan. 5, 2016

(65) Prior Publication Data
US 2016/0203145 A1    Jul. 14, 2016

Related U.S. Application Data

(60) Provisional application No. 62/099,673, filed on Jan. 5, 2015.

(51) Int. Cl.
*G06F 16/00* (2019.01)
*G06F 16/11* (2019.01)
(Continued)

(52) U.S. Cl.
CPC .......... *G06F 16/122* (2019.01); *G06F 3/0604* (2013.01); *G06F 3/067* (2013.01);
(Continued)

(58) Field of Classification Search
CPC ......... G06F 17/30598; G06F 17/30575; G06F 17/30221; G06F 17/30082; G06F 16/27;
(Continued)

(56) References Cited

U.S. PATENT DOCUMENTS

| 7,739,239 B1* | 6/2010 | Cormie | ................ G06F 3/0607 |
| | | | 707/626 |
| 7,958,234 B2* | 6/2011 | Thomas | .............. G06F 11/3438 |
| | | | 709/202 |

(Continued)

FOREIGN PATENT DOCUMENTS

WO    WO 2005/001646    1/2005

OTHER PUBLICATIONS

European Search Report and the European Search Opinion dated Apr. 14, 2016 From the European Patent Office Re. Application No. 16150127.5.

(Continued)

*Primary Examiner* — Jean M Corrielus
(74) *Attorney, Agent, or Firm* — FisherBroyles, LLP; Ariel Reinitz

(57) ABSTRACT

A method or system of managing data with high granularity, comprises identifying data objects and an associated data management policy. The policy uses features and a common semantic to define a feature-based sequence of data management actions of a data management operation that varies for different objects depending on respective features. Features of the data objects are obtained and then used to associate a data management action with the object using the policy so that the object is managed individually according to its own features, thus achieving high granularity of data management precision and also high flexibility.

37 Claims, 12 Drawing Sheets

(51) Int. Cl.
*G06F 11/14* (2006.01)
*H04L 29/08* (2006.01)
*G06F 16/27* (2019.01)
*G06F 16/28* (2019.01)
*G06F 3/06* (2006.01)
*G06F 16/182* (2019.01)

(52) U.S. Cl.
CPC .......... *G06F 3/0649* (2013.01); *G06F 3/0685* (2013.01); *G06F 11/1448* (2013.01); *G06F 16/182* (2019.01); *G06F 16/27* (2019.01); *G06F 16/285* (2019.01); *H04L 67/146* (2013.01); *G06F 2201/84* (2013.01)

(58) Field of Classification Search
CPC .... G06F 16/122; G06F 16/182; G06F 16/285; G06F 11/1488; G06F 3/0604
USPC ......................................................... 707/694
See application file for complete search history.

(56) References Cited

U.S. PATENT DOCUMENTS

| | | | | |
|---|---|---|---|---|
| 8,417,678 B2* | 4/2013 | Bone | ..................... | G06F 16/122 707/694 |
| 8,577,823 B1 | 11/2013 | Gadir | | |
| 8,918,586 B1 | 12/2014 | Todd et al. | | |
| 8,978,034 B1* | 3/2015 | Goodson | ............... | G06F 9/5038 718/101 |
| 9,043,372 B2* | 5/2015 | Makkar | ................. | G06F 16/907 707/827 |
| 9,043,919 B2* | 5/2015 | Wyatt | ................... | G06F 21/564 707/708 |
| 9,384,363 B2* | 7/2016 | Lim | .................... | G06F 21/6218 |
| 10,558,372 B1* | 2/2020 | Radhakrishna | ....... | G06F 3/0683 |
| 2003/0088573 A1* | 5/2003 | Stickler | ............. | G06F 17/30867 |
| 2003/0115204 A1 | 6/2003 | Greenblatt et al. | | |
| 2004/0003132 A1* | 1/2004 | Stanley | ............. | G06F 17/30286 719/316 |
| 2005/0226059 A1* | 10/2005 | Kavuri | ................... | G06F 3/0605 365/189.05 |
| 2006/0195476 A1* | 8/2006 | Nori | ................... | G06F 17/30569 |
| 2009/0271514 A1* | 10/2009 | Thomas | .............. | G06F 11/3438 709/224 |
| 2010/0042625 A1* | 2/2010 | Zoellner | .......... | G06F 17/30115 707/748 |
| 2011/0161293 A1* | 6/2011 | Vermeulen | .............. | H04L 67/42 707/626 |
| 2013/0346444 A1* | 12/2013 | Makkar | ................. | G06F 16/907 707/770 |
| 2013/0346494 A1* | 12/2013 | Nakfour | .............. | H04L 67/1095 709/204 |
| 2014/0214853 A1* | 7/2014 | Fischer | .................. | G06Q 10/06 707/742 |
| 2014/0379997 A1* | 12/2014 | Blaner | ................ | G06F 12/0831 711/146 |
| 2016/0191476 A1* | 6/2016 | Schutz | .................. | G06F 21/552 713/165 |
| 2016/0196324 A1 | 7/2016 | Haviv et al. | | |
| 2016/0381080 A1* | 12/2016 | Reddem | .............. | H04L 63/0884 726/1 |

OTHER PUBLICATIONS

European Search Report and the European Search Opinion dated Apr. 14, 2016 From the European Patent Office Re. Application No. 16150130.9.
Rocket Arkivio "Intelligent Data Management Required When Implementing a Modern Storage Infrastructure", Rocket Arkivio, White Paper, XP055261732, p. 1-25, Sep. 30, 2014. p. 6, Fig.1, p. 7, Para 3, p. 8, Para 3-5, p. 10, Para 1, p. 11, Para 1, p. 14, Para 1-3, p. 15, Para 3, Firg.6, p. 22, Para 4-5, p. 23, Para 1, p. 24, Para 1.

* cited by examiner

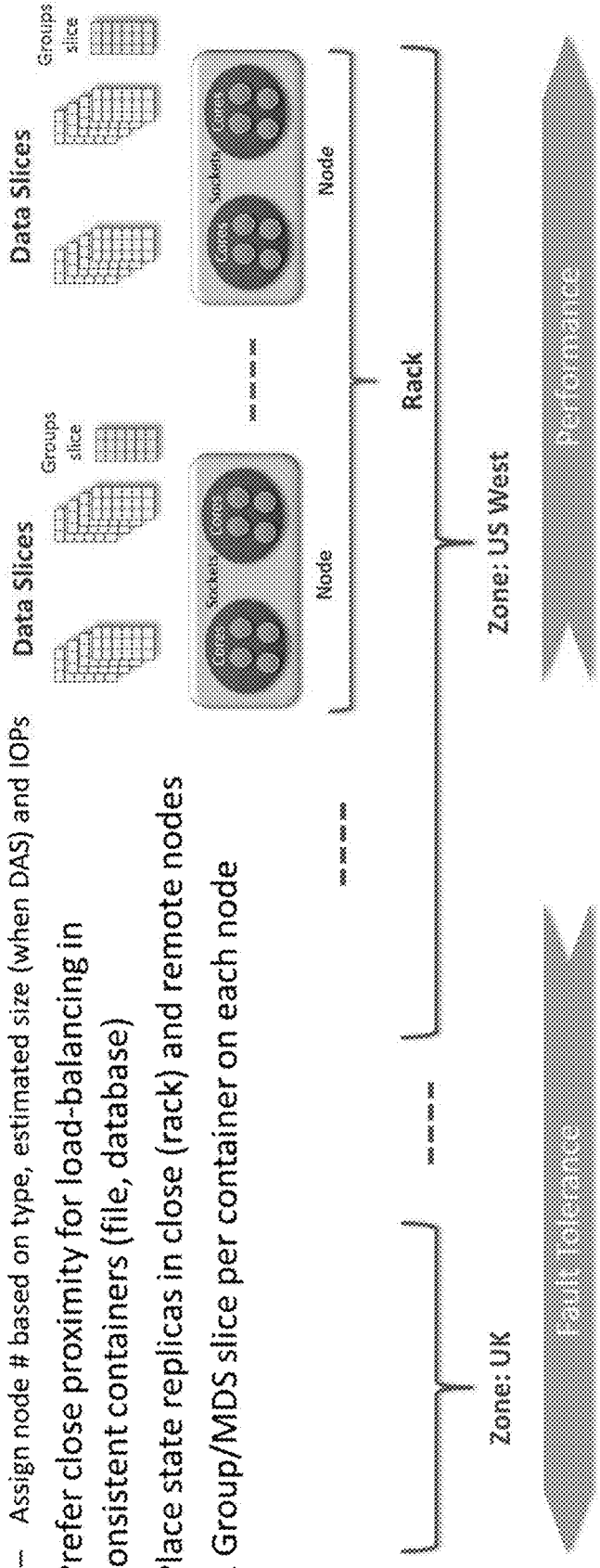

Local Sync and Replica

1. Write to local DPS master (master per object or Cgroup)
2. DPS sync with slave(s) and other Zone DPS masters
3. Slave(s) ack the sync/replica in write cache (not in OSS)
   - Slaves don't have to store in OSS in case of shared OSS or in case users want less replicas
4. Ack to user
   - Only wait for local/global majority ack (policy driven)
5. Data is written to OSS (after delay)
6. When data is safely stored in OSS, it Acks and the copy is marked in the extent tree
7. In case of Shared access OSS, other relevant DPS are notified of the placement, and can use this data in case the writing DPS failed (faster rebuilds, less impact)

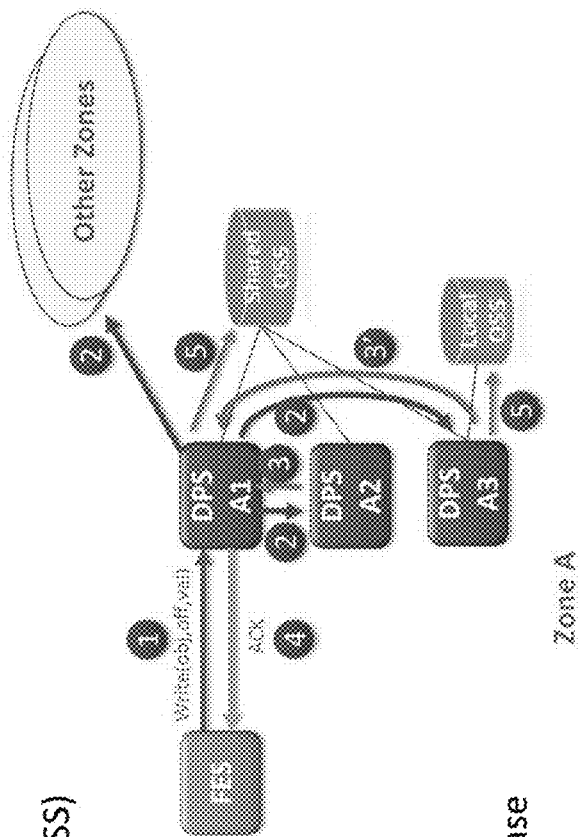

Fig. 10

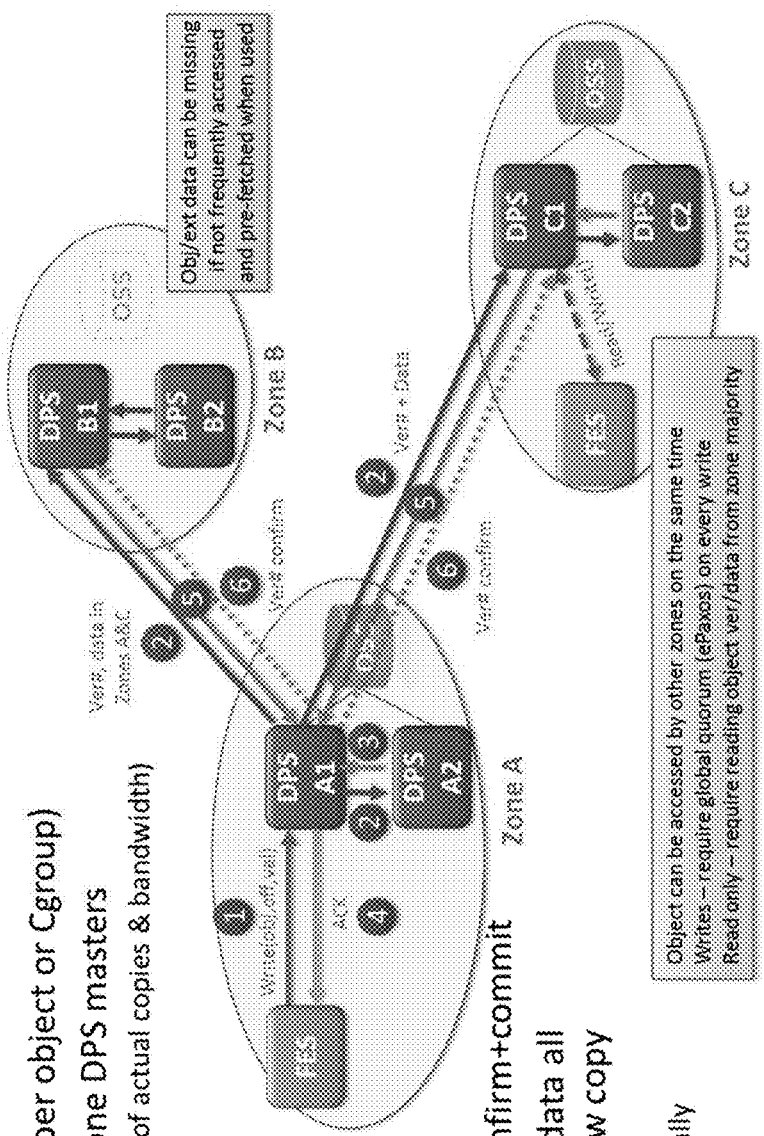

Global Distribution and DR

1. Write to local DPS master (master per object or Cgroup)
2. DPS sync with slave(s) and other Zone DPS masters
   - Ver# + zones only or ver# + data (to min # of actual copies & bandwidth)
3. Slave(s) ack the sync/replica
4. Ack to user
   - assuming local quorum (>1/2 DPS acks)
   - And object is parked/locked in this Zone
   - If object is not parked need to wait for global ver# quorum & extra copy ack
5. Remote DPS accept the ver#/copy
6. In case of non-parked send ver# confirm+commit
7. When shared access OSS store the data all other DPS are notified about the new copy
   - Locally shared — update local
   - Globally shared (e.g. cloud) — update globally

Fig. 11

SYSTEM AND METHOD OF MANAGING SERVICE ORIENTED DATA

RELATED APPLICATION

This application claims the benefit of priority under 35 USC 119(e) of U.S. Provisional Patent Application No. 62/099,673 filed on Jan. 5, 2015, the contents of which are incorporated herein by reference in their entirety.

FIELD AND BACKGROUND OF THE INVENTION

The present invention, in some embodiments thereof, relates to service oriented distributed data management with associated architecture and, more particularly, but not exclusively, to such a system that uses content and metadata to manage the data. Today the amount of storage keeps on growing exponentially, with major growth in new storage fronts such as cloud and BigData, and future growth trends with the emergence of the internet of things (IoT). In the new age data is dynamic, can move or replicate between different physical locations, can move between faster solid state storage or slower mechanical hard drives (HDD) based on usage patterns, and needs to be shared by many clients or applications, whether they are sensors, mobile phones, tablets, PCs, or application servers.

To date, most storage of data is block storage. Data is blindly arranged in blocks with no reference to the content. Multiple level storage can follow usage patterns as mentioned above to place more frequently used pieces of data in faster storage while keeping all of the data in main storage. Firewalls and other network control devices can inspect packets and direct data transfer according to the results, which may occasionally relate to the content, but there is no equivalent in data storage and management once beyond the bounds of networking.

The present trends suggest a different approach to storage, no longer silos of single vendor block storage mapped to a single client or application, but rather an adoption of highly scalable file or object based globally networked storage, which can serve many clients or applications, and connect to multiple local, remote, or cloud based storage resource islands/pools from a variety of vendors and be managed as a service.

Today there are some file sharing solutions in the form of NAS (Network Attached Storage) or even clustered/scale-out NAS solutions which have internal storage and support file access protocols, those however are limited in scale, provide only basic file management data services, and focus on local deployments.

Some new object storage solutions exist as local clusters or in the form of cloud storage, and examples include Amazon S3, Google Drive, and Dropbox, all of which are quite scalable, but are still limited in performance and in the data services that they provide, have limited consistency, and do not allow mixing various storage resources. The main use of those services is for backup and archiving and not as a form of enterprise storage or a way to unify different storage resources or protocols under the same governance.

Given the huge variety of potential clients and applications, each requiring different storage services, or different priorities, and the enormous scale and variety of the underlying storage resources, the management paradigm may be expected to change from the present day black box type of management which is agnostic to the data content.

SUMMARY OF THE INVENTION

The present embodiments may provide a service oriented distributed data resource management layer, which may in turn provide security, appropriate service levels, data life-cycle management, and features/functionality required by individual clients or applications or a group of such. Data is managed as data objects or groups of objects, based on content and metadata and the different protocols through which the data arrives, or management may be based on metadata which the system stores about those objects, and the protocols are mapped to a common data semantic in which features can be selected for highly granular data management policies. The features can be from the content, from the metadata, from the session history, information to do with the data source or the source history and the like and can be arranged into policies in advance, or dynamically as required. The data management and processing can be done in a distributed fashion, multiple data control and processing elements can be scattered locally and globally, those divide the data name space among them so each control element would only process a relevant portion of the data objects, thereby gaining scalability, higher level controller entities can distribute and synchronize the data management policies across all data processing elements. The data management and processing can be distributed and implemented in a cascading or topology driven fashion in which the same traffic or objects are processed by multiple stages and each stage may implement a portion of the data classification or processing tasks.

According to an aspect of some embodiments of the present invention there is provided a method of managing data, comprising:

identifying data objects, the data objects having attributes;

unpackaging said objects, said unpackaging comprising mapping said attributes to a common central semantic;

using said common central semantic, obtaining features of said data objects;

defining at least one data management policy for data objects using said features and said common central semantic, said data management policy defining a feature-based sequence of data management actions defining data management that varies for different objects depending on respective features; and applying said at least one policy to objects of said application or protocol according to said features as appearing in individual objects, thereby to carry out said data management for each object individually.

According to an aspect of some embodiments of the present invention there is provided a method of managing data, comprising:

identifying data objects having respective features, and an associated policy, said associated policy being a data management policy for data objects using said features, said data management policy defining a feature-dependent sequence of data management actions providing data management that varies for different objects depending on said respective features;

obtaining said respective features of given data objects;

applying at least one data management action to one of said data objects based on said at least one policy and according to features of said one data object; and managing said individual objects according to said policy and said respective features.

Data streams and objects can be scattered across a plurality of data processing elements which may reside in one or more locations, and each data processing element may manage and process all the data objects or a subset of the data objects or a subset of the data streams to gain scalability. One or more higher level data controllers may distribute the data management policies to the individual data processing elements.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 9 is a simplified diagram describing how data management and state may be distributed in local or global proximity to address performance, scalability, and availability, according to an embodiment of the present invention;

FIG. 10 is a simplified block diagram showing how a data object state and/or content may be synchronized in a local cluster, according to an embodiment of the present invention;

FIG. 11 is a simplified block diagram showing how a data object state and/or content may be synchronized in a global cluster, according to an embodiment of the present invention.

DESCRIPTION OF SPECIFIC EMBODIMENTS OF THE INVENTION

Figure 1:
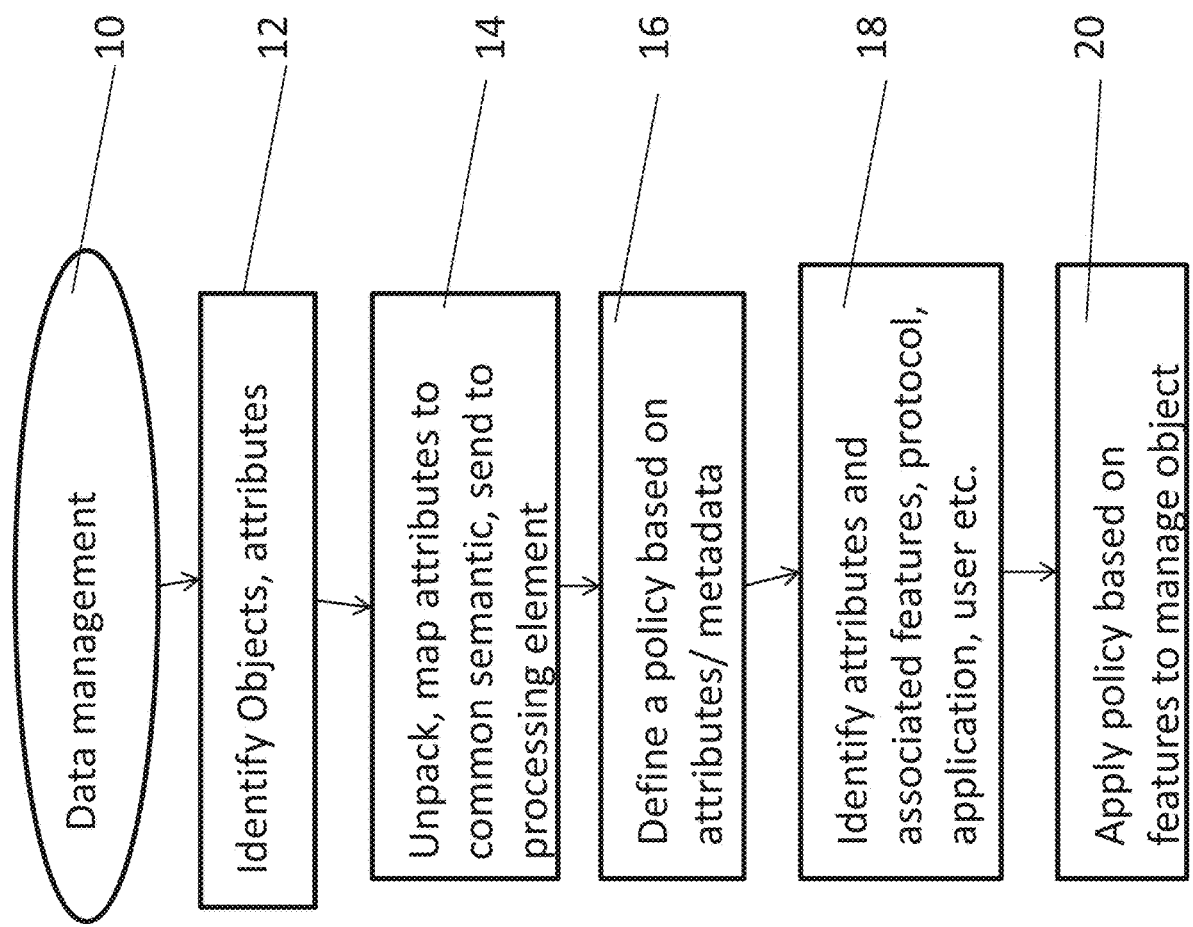
FIG. 1 is a simplified flow diagram showing the use of a single central protocol on which features of the data to be managed are mapped according to a first embodiment of the present invention.

The present invention, in some embodiments thereof, relates to a data management method and system and more particularly, but not exclusively, to a data management method and system that uses features within or associated with data objects to manage the data objects with high granularity in a distributed environment.

Data arrives in a session to be managed in various ways. Data management may involve different ways of storage, of making the data available to users, of backing up, replicating or keeping the data up to date, of taking snapshots, of providing redundancy and otherwise securing the data and of disposing of old and unwanted data. Data management may involve hierarchical arrangement of the data in layered storage, and data belonging to different users or data of different kinds may be managed in different ways. In one embodiment, rules belonging to different groups may be arranged in a hierarchy, for example rules handling data belonging to different users may form one group and rules for handling different kinds of data may be placed in another group, and then a hierarchical relationship between the two groups may be defined in order to solve conflicts between contradictory rules.

The position of the data in a hierarchy may be considered to be part of associated metadata.

A session in the present context is any framework in which data objects arrive, and the session has session attributes which define what the data is or where it comes from or where it is going or what to do with it and the like. The data can be tagged and the tags can be used to decide what to do with the data in the management system, that is to say to determine what policies apply. The policies may assign one or more present or future actions to the data.

To address the need for faster storage access, new mesh or edge/core data management topologies are being designed, similar to the way very large server networks are built, and the present embodiments allow the data management layer to try and manage or filter or cache the data in-flight in a more application aware manner, reducing the overhead and scalability challenges of current applications and reducing the dependency on network bandwidth or latency. When doing so there is even a greater need for scalable data management approaches which can guarantee a consistent view of the data, and provide consistent policy and data processing regardless of where the data may have come from or where it is being stored.

Today there is a wide variety of data access protocols which range from file oriented access, for example NFS, CIFS, WebDAV, FTP, . . . to object protocols such as Rest, Amazon S3, OpenStack Swift, and then there are other application specific protocols such as Hadoop HDFS and HBASE, and in many cases different clients may try and access the same file or object through different protocols. There is thus provided in accordance with some of the present embodiments the ability to map the attributes, including protocol attributes, of the incoming data to a common data transaction semantic, process the data requests according to the appropriate policy, and then read or store the data in the relevant storage resource which can also use different interfaces ranging from block protocols such as SCSI, SATA, iSCSI, FC, or file protocols, or object protocols, or memory semantics. In any service oriented data management layer there may be segregation between the access or storage media protocol and the data security, tiering, and retention etc policies.

Unpackaging and mapping may involve stripping away the specific structure or packaging of incoming data, and separating the content itself from the associated metadata. The metadata is stored in a uniform manner and associated with the content so that the content can be managed on a high granularity basis.

A preferred part of managing a service is the ability to constantly monitor the service usage and behavior, as part of a service oriented data management layer in which analytical data on the data access patterns, faults, capacities, usage, etc. may be collected.

Such data can be used by the system users or administrators or can be used by the system itself to adapt its behavior in a proactive manner, an example would be to migrate a storage resource closer to the actual user, or slow down or disconnect an abuser accessing shared data.

The present embodiments may thus provide a distributed, software defined, service oriented data management layer allowing many different clients and applications in different places using different access protocols to access large amounts of data stored in a variety of storage resources in different locations, while abstracting, securing, optimizing, monitoring, modifying, and managing the lifecycle of the data in a consistent way, and potentially embedding higher level data services in a scalable and fully programmable fashion.

In the present embodiments there may be multiple data controller elements, which distribute or replicate the storage namespace among them, and may provide flexible front-end connectivity to support any protocol or access pattern. The controller elements may be themselves controlled through a set of match/action based rules (similar to network packet routers) focused on data objects and services, and can store the data in variety of local or remote storage resources with difference performance or cost characteristics. Controller elements or portions of them may be arranged in a cascade with multiple stages, each such controller stage may implement parts of the data classification or data management action enabling greater scalability of the system.

In addition, there may be provided a control layer which processes and distributes the desired data services and access policies to the different data controller nodes. The processing can be distributed based on the origin of the data transactions or based on the data objects name space, or based on any other combinations.

By using flexible match/action rules the control layer may apply any type of data management behavior/function to any data object or object category or user or protocol or combination. This allows a software defined data management path, with enormous flexibility and granular control compared to the common practice today which is rigid and allows a limited set of actions per object or file directory. The policy may consist of a set of match/action rules which can be ordered according to the priority of each rule. This way if there are conflicts between rules or a partial match the rules with the higher priority wins. Multiple policy rules can be grouped together by application or through a usage scenario, and may be added or updated or removed in an atomic fashion to guarantee consistent policy behavior and simpler management. Having a flexible and software defined policy may provide for managing of shared data especially when addressing distributed, dynamic and large scale environments, with a variety of workloads each requiring different services.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 is a simplified diagram illustrating a method 10 of managing data according to an embodiment of the present invention. The method involves identifying 12 an application or protocol or data source or interface or the like to which the data to be managed relates. The objects have their own features which may have to do with the associated application or protocol etc, and the semantics are identified and mapped 14 on to a common semantic, as the object is unpackaged.

The common semantic may then be used to obtain features or metadata or content of data objects and identify a nearby data processing element to process that object policy. As will be explained below, the features or metadata or content may be found in the objects themselves or may relate to the network source, network source attributes, or users, including a user identity, or sessions or applications or protocols relating to the objects. Depending on the protocol or application, the data objects may be files, databases, database entries, data records, media streams, log or event streams, time series data, messages, OOP objects, data packets, or any other organizational unit of data. The features may be used to define 16 a data management policy or policies for object or type of object. When an individual object requires data management services, then features relating to the object are extracted 18, and then used to apply the policy so as to manage or service the object.

The features may be taken from the object content, from metadata either contained within the object or otherwise relating to the object, session history, information to do with the data source; information to do with the history of the data source, information to do with the protocol or application itself or any other information source that is available and relevant to management of the data.

In one embodiment the policy is ready in advance of receipt of a data object requiring data management or data services. In an alternative a policy may be provided dynamically with initial presentation of the objects.

Data management relates to a data management system say at enterprise level or data management at the cloud level, and may involve defining availability of particular data objects so that the policy defines availability of the objects in terms of the object features.

Data management may relate to storage of the data objects in a flexible storage hierarchy, so that the policy relates hierarchy levels to object features.

The policies may be applied to parts of objects, again based on features. Thus for example if the object is an article having a headnote and detailed text, then the availability of the headnote may be set higher than that of the detailed text. In this way, flexibility of the data management allows advantage to be taken of the levels of the data storage hierarchy.

Likewise, data management may relate to synchronization of the data objects with other objects elsewhere, and the policy may relate synchronization actions to features of the data objects.

Likewise, data management may relate to obtaining snapshots or a backup or archiving so that the snapshot or backup or archiving is governed by features relating to the objects.

The data management may include defined actions, and the data management method may involve attaching one or more of the defined actions to a data object according to the features of the object and the associated policy. The actions may be carried out by the backend logic but some, say the simpler actions, may be carried out at the front end to offload logic from the backend. Actions carried out at the front end may be carried out immediately upon data arrival and may use preset rules which do not depend on the central mapping.

The same object may have more than one policy applied thereto, each defining actions. The policies may be arranged in a hierarchy so that in the event of conflict between two actions, the action whose policy is higher in the hierarchy succeeds.

Figure 2:
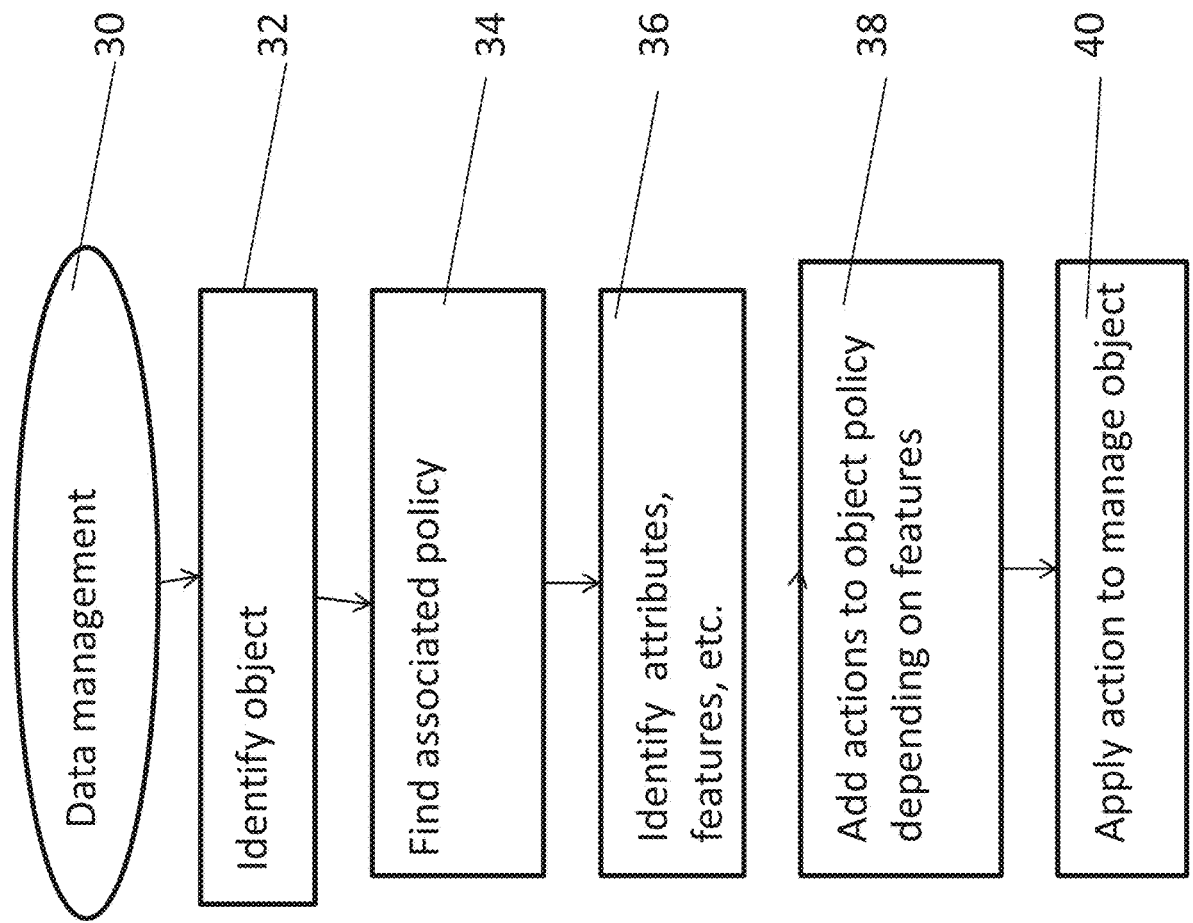
FIG. 2 is a simplified flow diagram showing the use of policies to apply data management actions to individual data objects according to an embodiment of the present invention.

Reference is now made to FIG. 2, which illustrates a further method 30 for managing data according to an embodiment of the present invention. In FIG. 2, the object is identified 32, and the associated policy is obtained 34. Then the features relating to the object are obtained 36 and an action is then added 38 to the policy or directly to the object. In box 40 the action is applied to manage the object.

As discussed with respect to FIG. 1, the application or protocol has attributes; and the attributes are mapped to a common central semantic, which serves as the basis for identifying features. The features belonging to the object, the session, the attributes or the originating protocol or application as a whole are used to obtain the policy, which may be software defined per individual user or session or in any other way for the application or protocol.

The action may be applied according to rules of the policy.

Examples of actions include any of the following: a routing action, a block action, a redirect action, a mirror action, a mapping action, a data caching action, a data pre-fetching action, a data tiering action, a snapshot action, a copy on write action, a data compression action, a data encryption action, a data deduplication action, a content filtering action, a pattern matching action, a remote notification action, a remote replication action, a QOS action, a QOS action defining bandwidth limits, a QOS action defining bandwidth guarantees, a QOS action defining priority, a QOS action defining limits or guarantees on the number of data or IO transactions per second, a QOS action defining a data size, a QOS action defining a data growth rate, a QOS action defining warning events, a tag set action, a tag increment action, a tag decrement action, a set attribute tag action, a data content processing action, generation of custom logs or reports action, and a function call action and a default action.

There may also be a set of actions that do not happen in the context of the incoming transaction, and these include examples such as: periodic backups or archiving of the data, which may operate according to a given schedule, periodic snapshots, periodic data synchronization between repositories, periodic report generation, periodic or schedule based data movement, automated data deletion, e.g. based on file aging from its creation data or last usage, periodic incremental replication, say in which after every n minutes the delta or changes are sent, tiering which may involve moving data between different storage classes based on the historical usage pattern combined with user policies, processing of the data content and transforming the content into a new form as a batch operation.

The different actions may be associated with elements in a control layer and the actions may operate their corresponding elements to manage the object.

The embodiments are now considered in greater detail, with respect to FIGS. 3 to 7.

Figure 3:
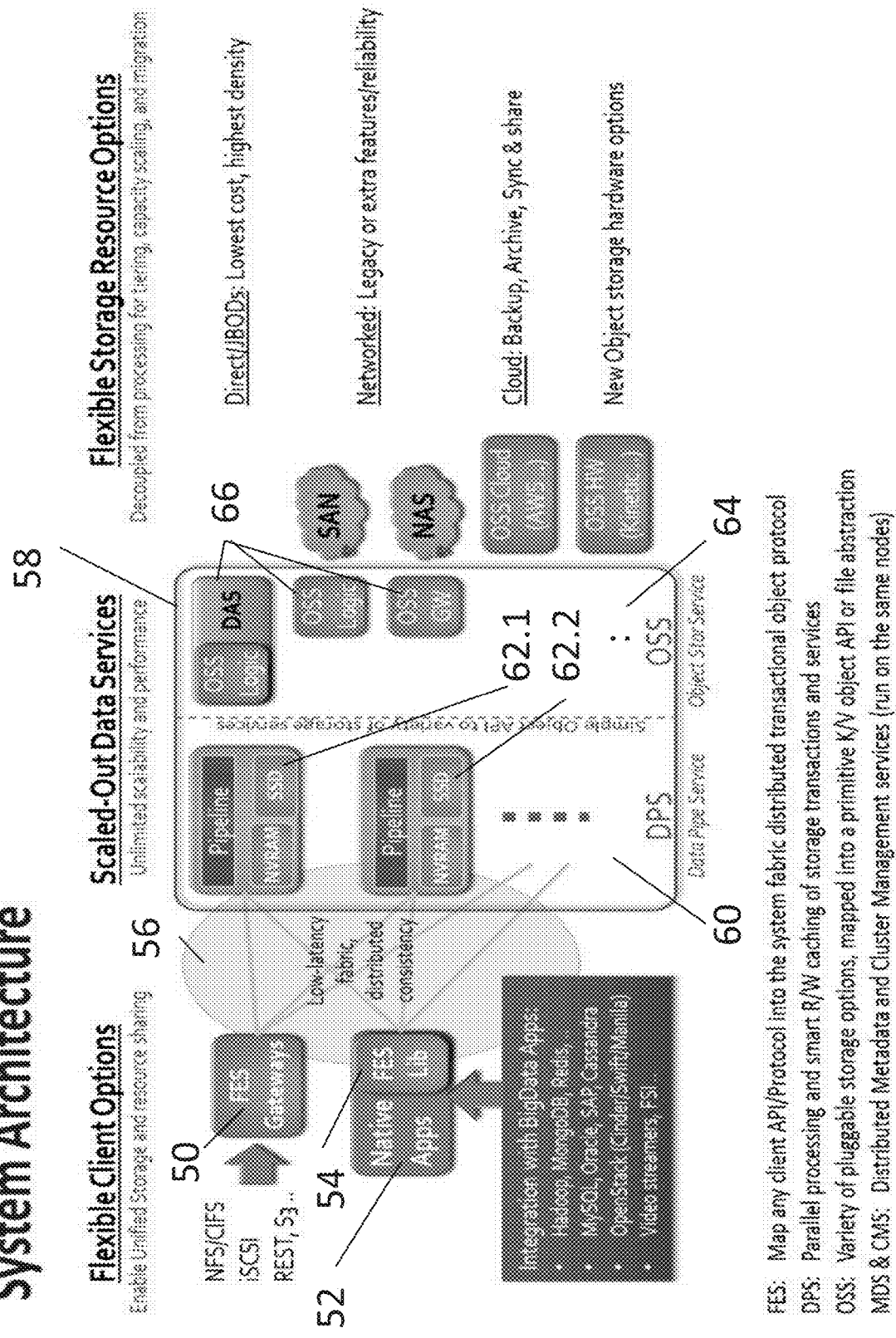
FIG. 3 is a simplified diagram illustrating a system architecture that allows multiple API's and protocols to use scaled out data services and flexible resource options according to an embodiment of the present invention.

FIG. 3 is a simplified diagram illustrating a system architecture that allows multiple API's and protocols to use scaled out data services and flexible resource options according to an embodiment of the present invention. The data services are provided in a pipeline, and the client options allow for the central protocol to cater for native apps using an FES library. The pipeline includes flexible client options for unified storage and resource sharing. The options include FES gateways which map any client or API or protocol into the protocol that is distributed in the system fabric and defines object transactions. Native applications 52 correspond to items in a FES library 54, and such an arrangement may provide for integration with commonly used big-data applications or applications commonly associated with big data such as Hadoop, MongoDB, Redis, also MySQL, Oracle, SAP, Cassandra, and OpenStack (Cinder/Swift/Manilla) also Video streamers and FSI.

A low latency fabric with distributed consistency 56 connects to scaled out data services 58 which are designed to provide scalability and performance which are potentially unlimited. A data pipe service (DPS) 60 provides parallel processing and smart read/write caching of storage transactions and services. There may be numerous individual pipelines 62.1 . . . 62.$n$. Object store service (OSS) 64 comprises a variety of pluggable storage options mapped into a primitive k/V object API or file abstraction. Three OSS logic instances 66 are shown. The architecture further provides flexible storage and resource options which are decoupled from processing, and which are used for tiering, capacity scaling and migration. The three options provided are direct, networked and cloud. Direct provides the lowest cost and highest density solution. Networking provides for greater reliability and is compatible with legacy applications. Cloud provides backup, archiving, synchronization and sharing options. The architecture can be scaled to include new storage options as they are introduced.

Figure 4:
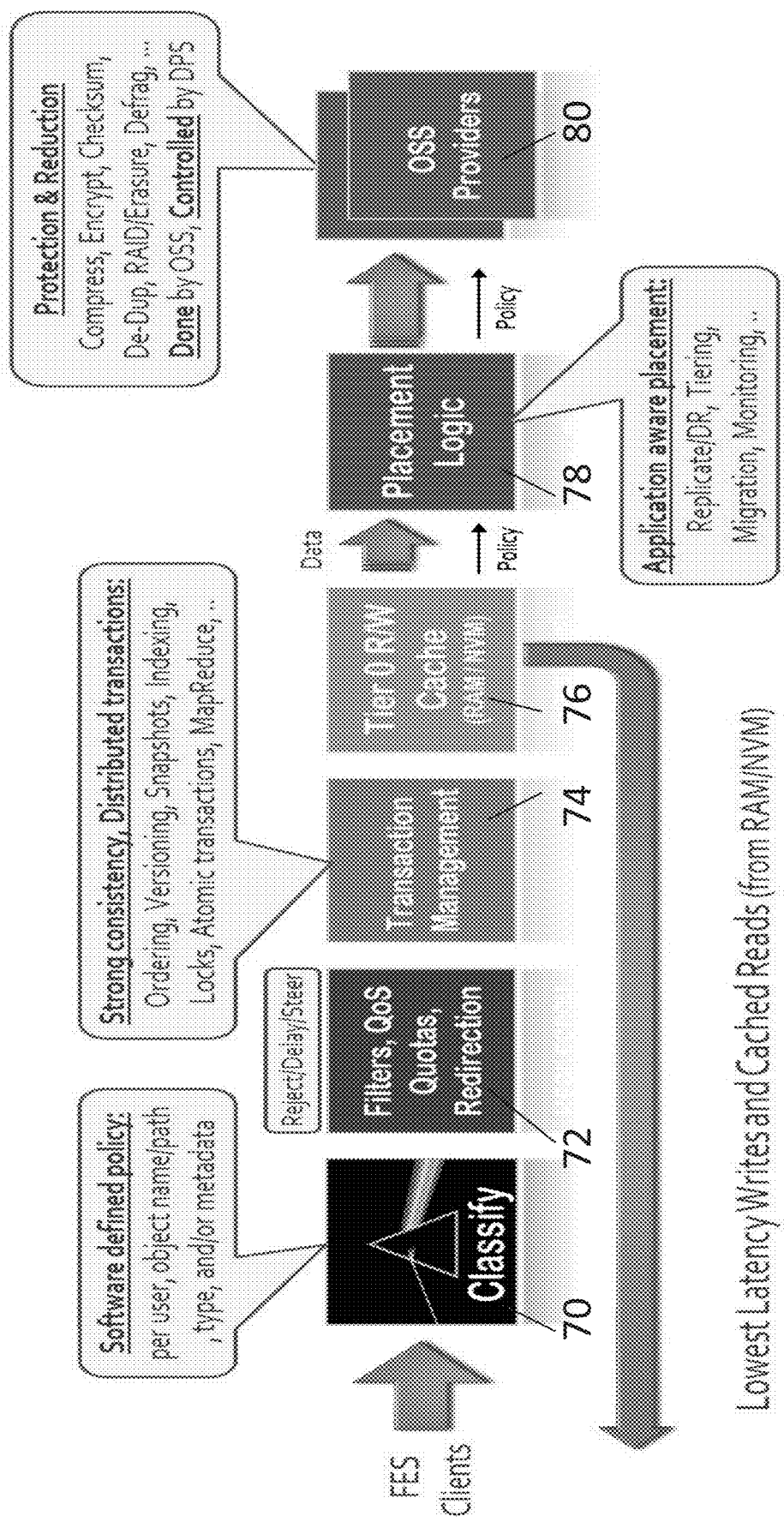
FIG. 4 is a simplified diagram showing a data pipeline service architecture according to an embodiment of the present invention.

FIG. 4 is a simplified diagram showing the data pipeline service (DPS) architecture of FIG. 3. FES clients are first classified in classifier 70 and assigned a software defined policy. The policy may be defined per user, or per object name or path or type and/or metadata. Data objects may be rejected, delayed or steered using filters, using QoS-based quotas or using redirection at unit 72. Transaction management unit 74 ensures that consistency is provided despite transactions being distributed in the fabric. In particular transaction management includes ordering, versioning, taking snapshots, indexing, locking, managing atomic transactions, etc. Tier 0 read/write cache 76 provides lowest latency writes and cached reads, and provides data together with a policy to placement logic 78 which may now carry out application aware data placement. OSS providers 80 then carry out compression, encryption, checksum, deduplication, RAID/Erasure and defragmentation under control of the DPS.

Figure 5:
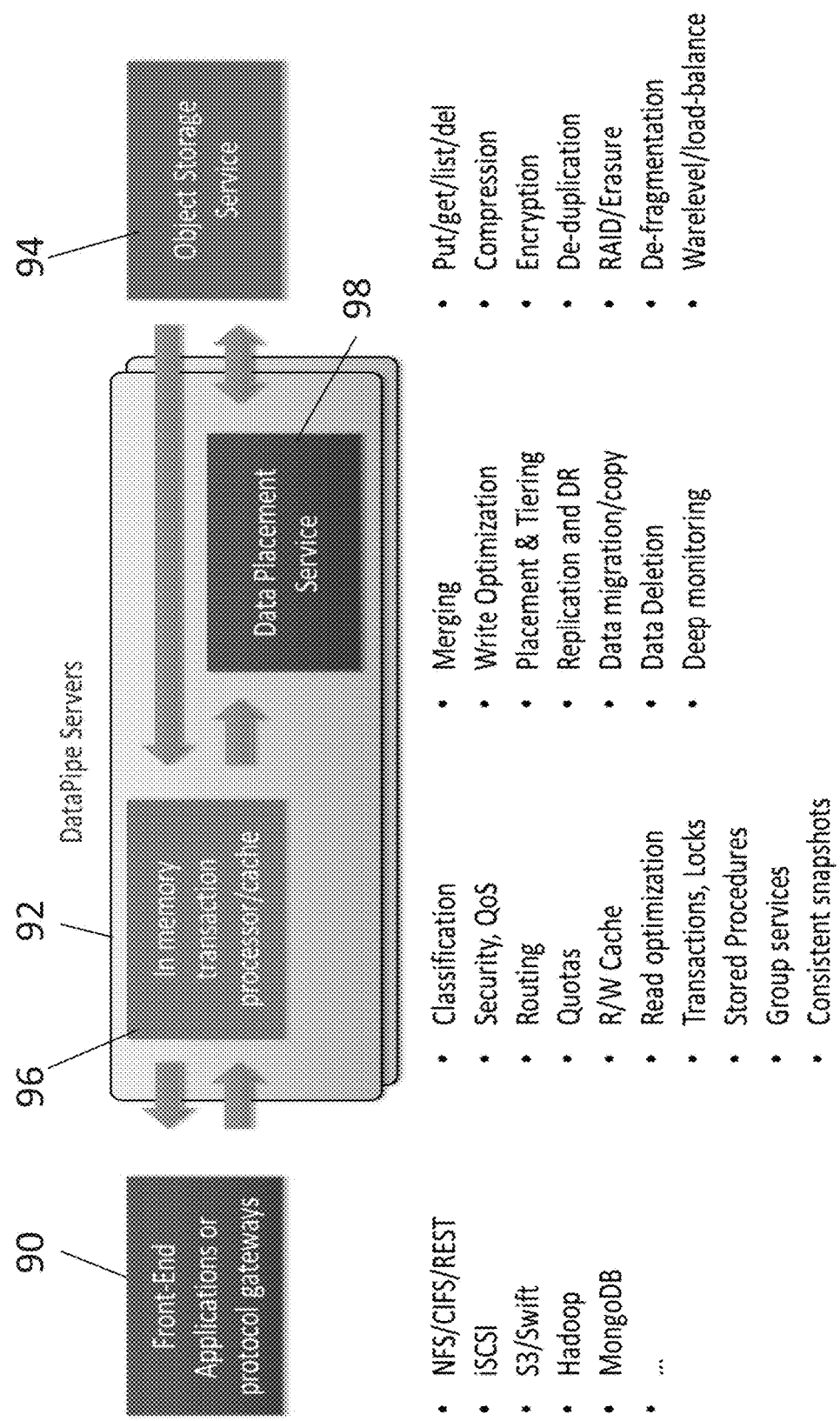
FIG. 5 is a simplified diagram showing a system view of an embodiment of the present invention.

FIG. 5 is a simplified diagram showing a system view of an embodiment of the present invention. A front end application or protocol gateway 90, with sample application listed, leads to datapipe servers 92, with sample operations shown and finally to object storage service 94, with sample storage operations shown. The datapipe servers are divided into in memory transaction processor cache 96 and a data placement service 98.

Data transport is bidirectional, and the outward direction from object storage 94 may avoid the data placement service 98.

Figure 6:
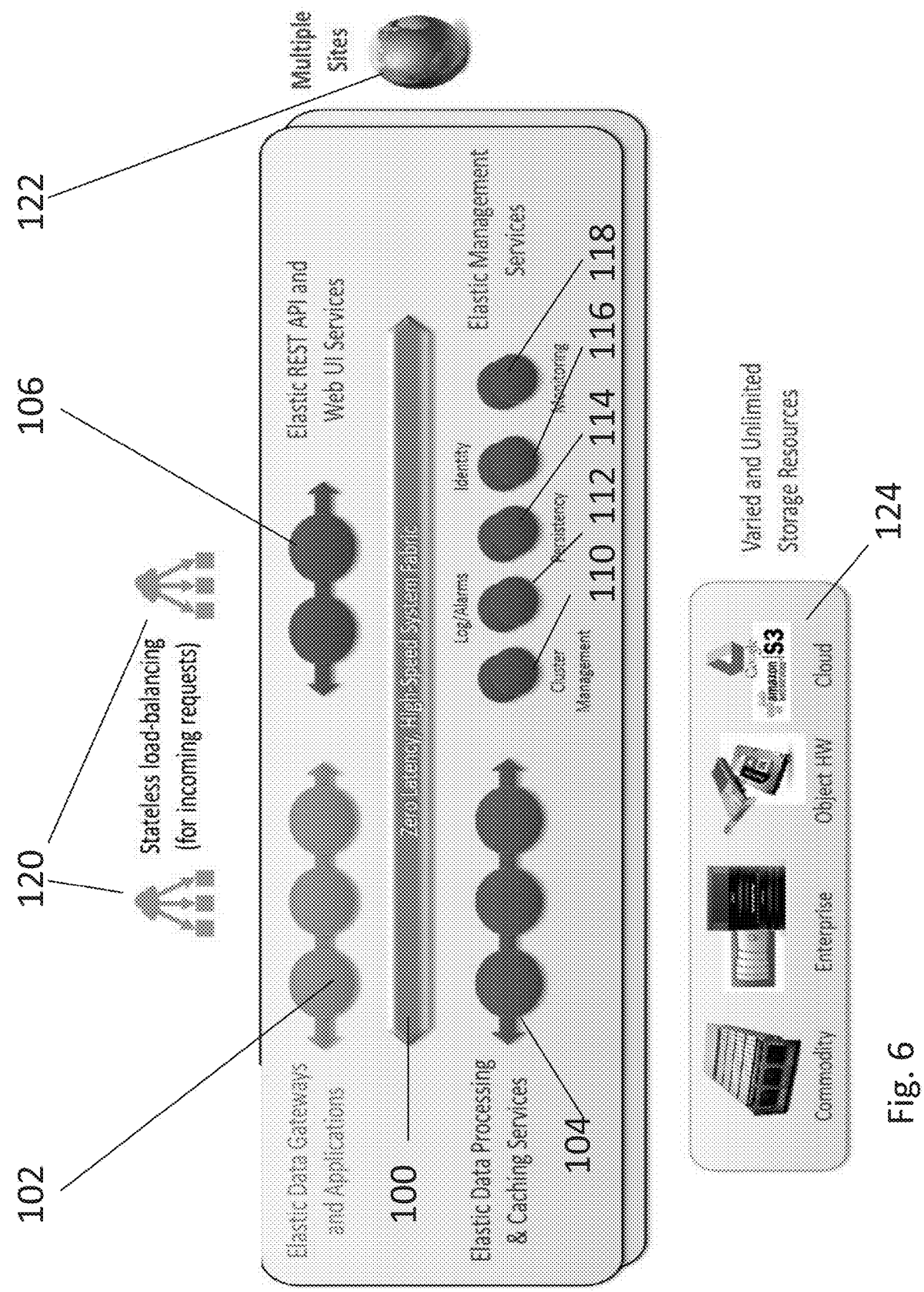
FIG. 6 is a simplified diagram illustrating elasticity within the data management services to allow for scalability, according to an embodiment of the present invention.

FIG. 6 is a simplified diagram illustrating elasticity within the data management services to allow for scalability, according to an embodiment of the present invention. A zero-latency high speed system fabric 100 supports elastic data gateways and applications 102, elastic data processing and caching services 104, elastic REST API and web UI services 106, elastic data processing and caching services 108, cluster management 110, log/alarms 112, persistency control 114, identity control 116, and monitoring 118. Stateless load balancing 120 for incoming requests allows use of multiple sites 122 and makes use of varied and potentially unlimited storage resources 124 including commodity, enterprise, hardware and cloud.

Figure 7:
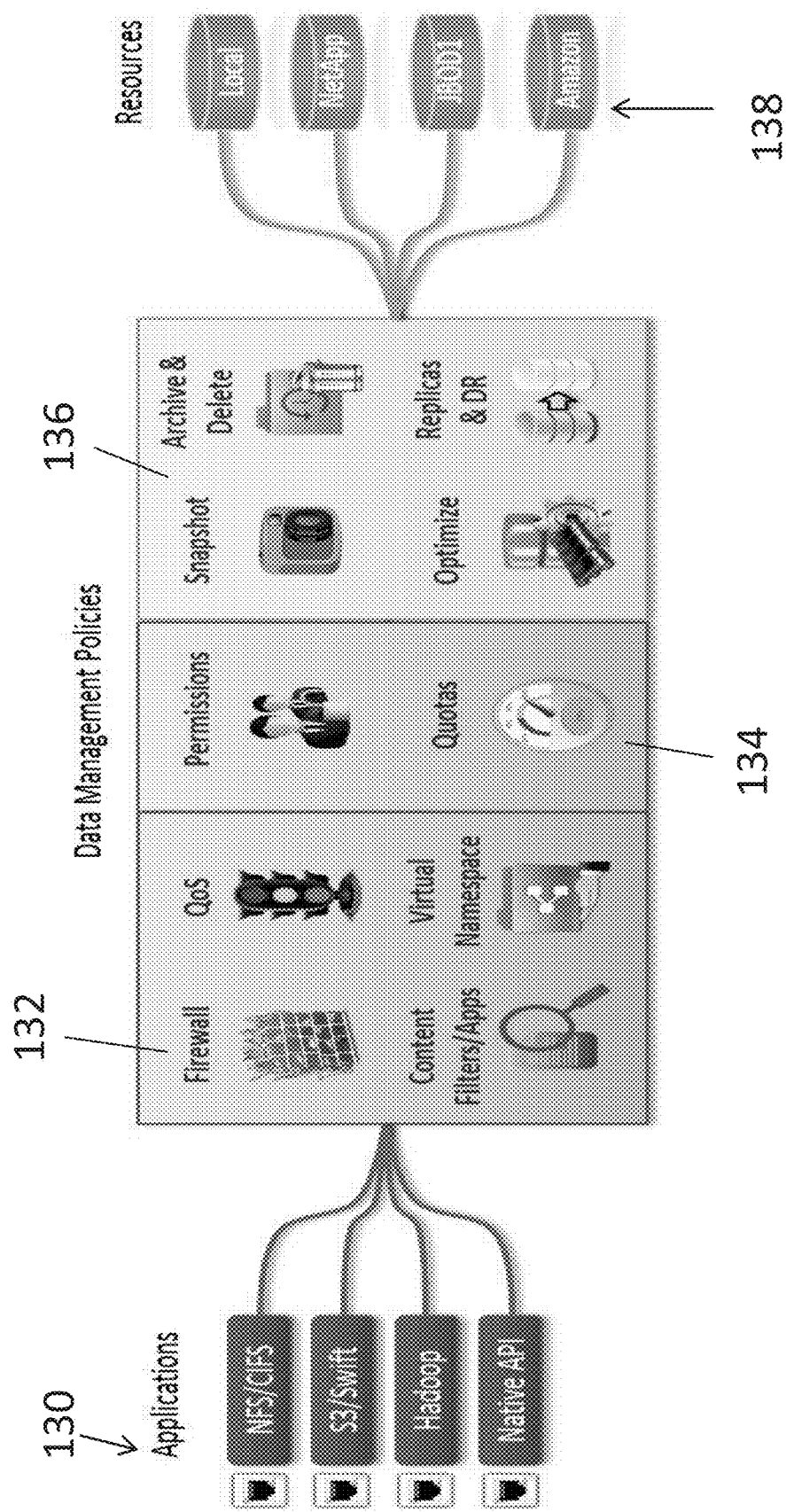
FIG. 7 is a simplified block diagram showing different areas to which the data management policies may relate according to embodiments of the present invention.

FIG. 7 is a simplified block diagram showing different data management policies and how they may relate to applications and assignment of resources according to embodiments of the present invention. Data objects arrive from a variety of applications 130, of which several examples are shown and then pass through three levels 132, 134 and 136 of data management policies. Finally the objects are assigned to resources 138, again a few examples being shown. The data management policies of the first level 132 include a firewall, QoS, content filters and applications, and a virtual namespace. The second level 134 includes permissions and quotas, which may act via the first level policies. The third level includes snapshot, archive and delete, optimize and replicas and data reproduction.

Figure 8:
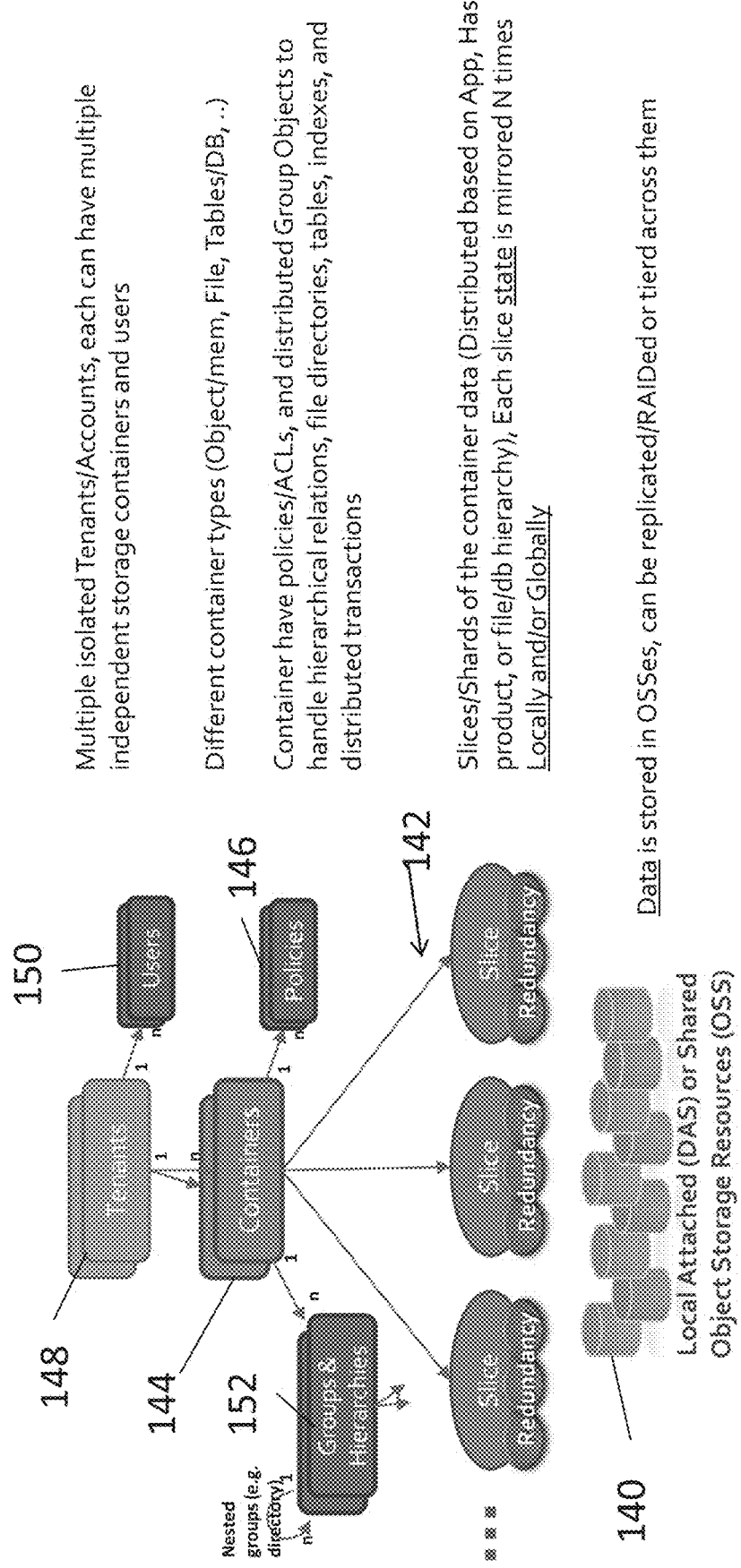
FIG. 8 is a simplified diagram describing a potential logical arrangement of the object data into data containers, according to a preferred embodiment of the present invention.

FIG. 8 is a simplified diagram describing a resource hierarchy. A potential logical arrangement of the object data is made into data containers, each data container being sub-divided into slices (shards) which are stored on local or shared storage resources. Data containers are associated with policies, and can belong to a tenant, and data containers can be replicated in multiple locations. The data is actually stored in shared object storage resources (OSS) 140. The slices or shards 142 are made up of data from containers 144 which share policies 146 and which each belong to specified tenants 148. The tenants are associated with users 150. The slices or shards 142 of the container 144 data may be mirrored globally or locally and may be distributed based on application, hash product or file or database hierarchy or the like.

The containers may be of different types and may have policies/ACLs, and distributed group objects to handle hierarchical relations, file directories, tables, indexes, and distributed transactions.

Each tenant may have multiple containers and multiple users. The container data may be sliced into groups and hierarchies 152 including nested groups such as a directory structure.

FIG. 9 is a simplified diagram describing how data management and state can be distributed in local or global proximity to address performance, scalability, and availability. The slices of FIG. 8 are assigned as N slices per container. N may depend on the total number containers and a minimum number of slices. Node numbers are assigned based on type, estimated size etc. Close proximity is preferred for load balancing when containers have to remain consistent, for example files and databases. Replicas may be placed in close by nodes, say on the same rack, and remote nodes. One group or MDS slice per container may be present on each node. The figure illustrates the placing of consistent data on different nodes of the same rack for performance and on a geographically distant zone for fault tolerance.

FIG. 10 is a simplified block diagram showing how a data object state and/or content can be synchronized and replicated in a local cluster. In 1 the FES data is written to a local DPS master. There may be several masters and the correct master for the object may be used. In 2 the DPS master synchronizes with DPS masters in other zones and with slaves. In 3 the slaves acknowledge the synchronization/replication in the write cache, but do not at this stage use storage resources. In 4 an acknowledgement is sent to the user. In 5, after a delay, the data is written to the storage resource OSS. In 6 the OSS acknowledges and the copy is marked in an extent tree. In 7, for shared access OSS, other DPS's that are involved are notified of the data placement and may use the data in case of failure. The arrangement allows for faster rebuilds and less impact on regular data processing.

FIG. 11 is a simplified block diagram showing how a data object state and/or content can be synchronized in a global cluster. Data replication with global distribution may involve 1 writing to a local DPS master, who may be selected per object type or Cgroup. In 2 the DPS synchronizes with slaves and with DPS masters from other zones.

In 3 the slaves acknowledge the synchronization or replication.

In 4 an acknowledgement is sent to the user.

In 5 the DPS's from other zones accept the copy of the data.

In 6 non-parked data is confirmed, and in 7, when shared access OSS stores the data, all other DPSs are notified about the new copy, as in the local example above.

Figure 12:
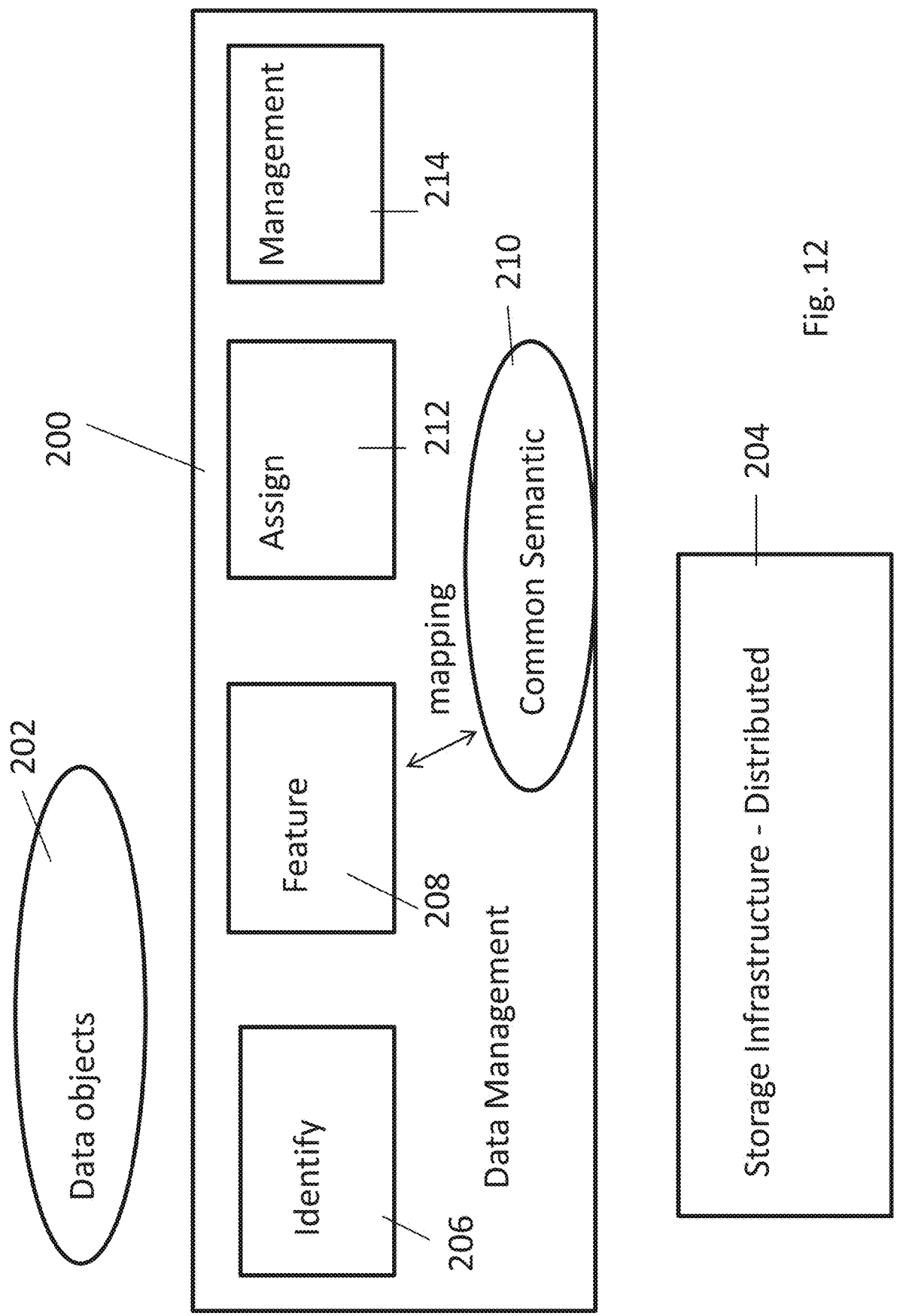
FIG. 12 is a simplified block diagram showing a schematic system view of an embodiment of the present invention.

Reference is now made to FIG. 12, which is a simplified diagram showing a system 200 for managing data. The system lies between external data objects 202 and a distributed storage infrastructure 204. The data objects 202 of the external world may belong to all kinds of users, applications, real and logical locations and may include all kinds of features and attributes as well as content. The data objects in the outside world are initially undefined to the system 200.

The system 200 contains an identifying unit 206 whose task is to identify data objects having particular features that it already knows about and an associated policy. The associated policy is a data management policy that the system has already assigned for data objects using having the given features identified. The data management policy may define a feature-dependent sequence of data management actions varying for different objects depending on the respective features.

A feature obtaining unit 208 obtains the features from the given data objects, which the identification object may then understand and use to associate the object with the corresponding policy. To be clear, the feature obtaining unit identifies features on a given data object and the identification unit uses those features to decide what the object is and what it belongs to.

A data management assignment unit 212 assigns data management tasks to the object based on the associated policy. The management unit 214 then manages the individual objects according to the policy the features and the assigned management tasks. Common semantic 210 stores the various features, that may come from numerous protocols, in a single unified arrangement, allowing the system 200 to provide application aware data management overall.

Feedback between different stages may be implemented. A data management action may set a common semantic attribute associated with said object, that may be used in subsequent operations. A policy may drive the system to update an object attribute, and that attribute can be classified by the following stages in the processing phases to further drive new actions, or the new attribute may serve as an input to the classification and be taken into account when later following messages arrive.

Features of the present embodiments are now discussed in greater detail and include the following:

Front-end Protocol/Application gateways service (FES)
    Map the application/protocol specific semantics into the data pipeline fabric APIs and identify a data pipeline service (DPS) which will process the data, FES is stateless and the objects state and cache is maintained by the DPS
    There can be multiple FES types and protocols:
        File system gateways: NFS, CIFS, HTTP, FTP, WebDAV, Local (VFS/POSIX) APIs
        Object gateways: REST, Swift, S3, Librados (Ceph)
        Block: iSCSI, iSER, FC, SAS, SATA, Local block device emulation.
        Key/value store APIs, or database record access APIs
        API library for native integration with any $3^{rd}$ party applications
    Some of the policy, for example access control and partial classification, can be executed by the FES gateway this way offloading the back-end processing and minimizing the flow of redundant or unwanted traffic.
Data Pipeline Service Nodes/Cluster (DPS)
    Manage the storage transactions and storage objects
    Low-latency, distributed, consistent/transactional data flow pipeline
    Real-time policy based data filtering, indexing, tiering/routing, manipulating, and monitoring
    Local NV-RAM or BBU (Battery Backed-up Unit) for write cache and metadata log/cache
    Local SSD for metadata, fast storage and read cache
Object Storage Services (OSS) and Resources
    Local DAS storage (with Object APIs such as LevelDB and/or local file-system such as BTRFS or EXT4 or NTFS)
    SAN with mounted file system or Object APIs
    NAS (mounted via NFS, CIFS, HDFS, . . . clients)
    External Object storage: Ceph/librados, Swift, S3, . . . (via their native client)
    Object Storage hardware such as Seagate Kinetic, FusionIO
    Cloud Object storage (Amazon, Google, Dropbox, Ctera, . . . )
    Remote/Disaster-recovery sites
Metadata Service (MDS)
    Manage central metadata filesystem/container operations
    Directory or group operations (list, create/delete/ . . . , snapshot)
    Mapping of file directory entries to iNodes/Objects
    MDS is a distributed entity and can have instances across the system
Cluster Management and monitoring (CMS)
    Highly available system and cluster management
    Cluster management is in charge of managing all the services and policies in a local site, and potentially synchronizing with other cluster managers in different sites.
    Managed via open REST APIs
    HTML5 based user interface
    Object oriented CLI (command line interface)
    Remote notifications and logging via standard mechanisms
    Store and distribute policy to FES/DPS/MDS/OSS services in a consistent way
    Multi-tenancy by design (support multiple tenants, each with its isolated view of the system)

Policy is stored per container, container belongs to an account/tenant.

The match Key can consist of some or all of the following fields, which make up the session attributes:
Session data
    Source host/IP/subnet
    Destination IP/Port
    User/Group identity
    Account/Tenant/Container/destination
    Client protocol (e.g. NFS, CIFS, S3, . . . )
Object metadata
    Object Name, Object ID, Object Prefix, partial name/path Match
    Type, category (e.g. "video files")
    Sub-object record id/name, column name
    Current metadata tags (stored in the object)
    hash of name+mask
Operation
    Operation type: Read, write, create, delete, . . .
    Offset in object, range
    Requested time range
    Object attr/xattr+value (tag) object content elements, or object field content Policies have states to disable/enable.

The system can mark the user creating the policy, and/or restrict creation of certain rules to a subset of users. Policy can be organized by layers, layers can be restricted to view/modify by individual users, layers can be inherited from other containers and/or general user or tenant policy.

Actions can be grouped to policy or IO/app types/behaviors (to simplify for users).

A date and/or time range and expiration time may be associated with a policy rule (indicating a rule will only be active during that time).

Below are Several Classes of Actions:

Routing Policy Actions
  Offline (access is suspended)
  Action
    Default
    Block
    Redirect: to destination NAS/OSS+path+user w/o caching
    Mirror: write async to both local and external storage/DR, specify Read/Write-mostly, mirrored IO done at first stage (pre), specify local and remote user/role
    Copy on write: when objects are written copy the file to a new repository, otherwise read the objects from the original repository
    Map: file share/mount point to path, optionally re-assign user/role
  QoS:
    Rx/TxxIOPs/Bandwidth rate limits & guarantees, Priority
    size increase/time, or objects created/time
    optional warning events
  Set Tag: set/inc/dec/stamp xattr tag when event occurs
  Log the operation in different detail levels
  Modify fields or content of the transaction
  Callback or content processing: call a specific function/service when event occurs
    Allow running custom procedure on read/write/open/ . . . (e.g. for data inspection, custom manipulation, pre-fetch logic . . . )
Object Policies
ACLs
  specify access permissions per role/group/user
  apply to specific or all sub-folders
  auditing
Quota
  specify size and object # limits, warning levels per all/user/group
  warnings sent to log and owner/admin (can be a general config)
Placement Policy
  described where and how data is stored or fetched to maximize cost/performance
    Define primary storage tier (memory, Intensive Read (TLC), Intensive R/W (SSD), low-latency R/W (NVMe), Capacity (SATA), Cold, hybrid) and its properties
    Storage pool (or auto selection)
    Data protection level
    Select workload profile (see definitions below)
    Latency objectives and actions
    features: compression, deduplication, encryption, etc.
Workload Profile (Storage Class)
Defines One or More of the Following Behaviors:
Latency Target
  Latency target
  Latency priority (vs. cost)
  Alarm if latency>x milliseconds for t time
Flash Acceleration
  Enable/Disable
  Select Auto or specific pool
  Protection (x0, x1, x2)
  Cache Random Writes
  Store files smaller than xKB in Flash
  Cache Random Reads
Read Optimizations
  Read ahead size
  Delayed reads, queue size, max delay
  Cache priority
Write Optimizations
  Delayed writes, Min IOs to commit, Min Size to commit space allocation (writes)
  Default Block size
Rebuild Priority
Lifecycle Policy
  Snapshots: hourly, daily, monthly, target OSS per each, size/% limits per each
  Disaster recovery attributes
  Full/Partial backup schedule, destination OSS(s)
  Sync and share (to a remote cloud service)
  Data migration between storage repositories or tiers
  Must not delete before date (WORM, Immutability)
  Delete after n days (from create or last read, or last update) or after it was archived
  Transformation, read through a set of objects matching the filters and generating a new transformation of data.
  Search, look for certain content or metadata in a set of objects matching the filter The Lifecycle policy can be executed based on incoming transactions, or at a given schedule, or right after certain system activities or events.

Monitoring
Monitor (Source Host/Net/User/Group+Protocol, Object path/type, Current Tags)
  Counters/Charts: measure IO, Bandwidth, Opens, create, latency, cache-hits, random/seq statistics
  Alarms: send notification when min/max/avg/sum of counter is >/z/=X for at least N periods of T (time)
  Activity logs (record of all operations, by operation filter)
  Heatmaps per object, provide indication on seq/rand, r/w, data locality, cache hits
  Reports can be stored as templates/dashboards or sent on scheduled event to user email Policy Distribution and Synchronization As previously described, policy can be enforced by multiple data processing services (DPS) in a global scale. Such enforcement may require replicating the policy and state of the data objects in all the relevant processing elements in a consistent way.

To enable better scaling and performance the data object processing may be scattered across multiple data processing services (DPS) where each such service may only process a portion of the data namespace, that is individual objects or containers or some portion of those, so that each service needs to only hold and manage a portion of the data management policy which is relevant to those objects. In such a case the front-end services (FES) need to know where to direct the traffic to, so only data management services that are synchronized on the policy and state of data objects process those data objects and the system maintains a consistent policy and data view.

Multiple data processing services in the same or different locations may manage the same data objects to enable greater performance or locality or availability or scalability. In such a case the object state and/or policy and/or content may need to be replicated across all the services which may manage the same data.

A higher level controller entity can take the global policy and break and/or replicate the policy into multiple data processing services in different locations in a consistent way.

It is expected that during the life of a patent maturing from this application many relevant data management services and transactions will be developed and the scopes of the corresponding term are intended to include all such new technologies a priori.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment, and the above description is to be construed as if this combination were explicitly written. Conversely, various features of the invention, which are, for brevity, described in the context of a single embodiment, may also be provided separately or in any suitable subcombination or as suitable in any other described embodiment of the invention, and the above description is to be construed as if these separate embodiments were explicitly written. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system comprising:
    a processing device; and
    a memory coupled to the processing device and storing instructions that, when executed by the processing device, cause the system to perform operations comprising:
       identifying a data object having one or more features and an associated policy that defines a sequence of actions that provide data management for the data object based on the one or more features;
       obtaining the one or more features of the data object using a common semantic with respect to which attributes associated with the data object are mapped;
       applying (a) a first action from the sequence of actions to the data object based on the policy and according to the one or more features of the data object wherein the first action sets a common semantic attribute associated with the object for use in subsequent operations, and (b) a second action from the sequence of actions to the data object based on the policy and according to the one or more features of the data object, wherein the policy further comprises an action to update one or more attributes of the data object; and
       managing the data objects according to the policy and the one or more features, wherein managing the data object comprises providing an output with respect to the data object.

2. The system of claim 1, wherein the policy is defined according to one or more operations of the data object.

3. The system of claim 1, wherein the policy comprises a cascade of policies.

4. The system of claim 1, wherein the common semantic comprises a distributed semantic, the operations further comprising mapping the common semantic to a common distributed protocol and using the common distributed protocol to obtain the one or more features from the data object.

5. The system of claim 1, wherein the policy is software defined.

6. The system of claim 1, wherein the policy is obtained in advance of arrival of a first object, or wherein the policy is obtained using a cookie.

7. The system of claim 1, wherein the operations further comprise identifying a first object of a given application or protocol and using one or more features found in the first object to identify one or more further objects belonging to the application or protocol.

8. The system of claim 1, wherein at least one of the first action or the second action comprises at least one of:
    a routing action, an admission action, a redirect action, a mirror action, a mapping action, a data caching action, a data pre-fetching action, a data tiering action, a snapshot action, a copy on write action, a data compression action, a data encryption action, a data deduplication action, a remote replication action, a QOS action, a QOS action defining bandwidth limits, a QOS action defining bandwidth guarantees, a QOS action defining priority, a QOS action defining limits or guarantees on the number of transactions per second, a QOS action defining a data size, a QOS action defining a data growth rate, a QOS action defining warning events, a tag set action, a tag increment action, a tag decrement action, a set attribute tag action, a data content processing action, generation of custom logs or reports action, a function call action, a content filtering action, a pattern matching action, a remote notification action, a sending action, a blocking action, or a default action.

9. The system of claim 1, wherein the data management comprises services provided within a pipeline, and wherein at least one of the first action or the second action operate a control element in a control layer to manage the data object.

10. The system of claim 1, wherein the at least one of the first action or the second action comprises at least one of: periodic backups of the data, archiving of the data object, periodic taking of snapshots of the data object, automated data object deletion, periodic incremental replication, tiering, processing of the data object, or transforming the data object or the one or more features into a new form.

11. The system of claim 1, wherein the data management relates to synchronization or replication of the data object and the policy relates synchronization actions to the one or more features of the data object, or to backup or archiving or taking snapshots of the data object, or the policy relates backup or archiving snapshot actions to the one or more features of the data object, or to storage of the data object in a flexible storage hierarchy, or the policy relates hierarchy levels to the one or more features of the data object.

12. The system of claim 1, wherein the policy belongs to a policy hierarchy, wherein a plurality of policies apply to the data object and wherein conflicting actions of the plurality of policies are resolved based on the hierarchy.

13. The system of claim 1, wherein data containers are provided for logical arrangement of the data object, according to one or more of: a policy or a tenant, wherein each data container is sub-divided into slices, which slices are stored on local or shared storage resources and are replicatable to multiple locations.

14. A method, comprising:
identifying a data object having one or more features and an associated policy that defines a sequence of actions that provide data management for the data object based on the one or more features;
obtaining the one or more features of the data object using a common semantic with respect to which attributes associated with the data object are mapped;
applying (a) a first action from the sequence of actions to the data object based on the policy and according to the one or more features of the data object, wherein the first action sets a common semantic attribute associated with the object for use in subsequent operations, and (b) a second action from the sequence of actions to the data object based on the policy and according to the one or more features of the data object, wherein the policy further comprises an action to update one or more attributes of the data object; and
managing the data object according to the policy and the one or more features, wherein managing the data object comprises providing an output with respect to the data object.

15. The method of claim 14, wherein the policy is defined according to one or more operations of the data object.

16. The method of claim 14, wherein the policy comprises a cascade of policies.

17. The method of claim 14, wherein the common semantic are comprises a distributed semantic, the method comprising mapping the common semantic to a common distributed protocol and using the common distributed protocol to obtain the one or more features of the data object.

18. The method of claim 14, wherein the policy is software defined.

19. The method of claim 14, wherein the policy is obtained in advance of arrival of a first object.

20. The method of claim 19, wherein the policy obtained in advance is obtained using a cookie.

21. The method of claim 14, further comprising identifying a first object of a given application or protocol and using one or more features found in the first object to identify one or more further objects belonging to the application or protocol.

22. The method of claim 14, wherein at least one of the first action or the second action is applied according to the policy.

23. The method of claim 14, wherein at least one of the first action or the second action comprises at least one of:
a routing action, an admission action, a redirect action, a mirror action, a mapping action, a data caching action, a data pre-fetching action, a data tiering action, a snapshot action, a copy on write action, a data compression action, a data encryption action, a data deduplication action, a remote replication action, a QOS action, a QOS action defining bandwidth limits, a QOS action defining bandwidth guarantees, a QOS action defining priority, a QOS action defining limits or guarantees on the number of transactions per second, a QOS action defining a data size, a QOS action defining a data growth rate, a QOS action defining warning events, a tag set action, a tag increment action, a tag decrement action, a set attribute tag action, a data content processing action, generation of custom logs or reports action, a function call action, a content filtering action, a pattern matching action, a remote notification action, a sending action, a blocking action, or a default action.

24. The method of claim 14, wherein the data management comprises services provided within a pipeline.

25. The method of claim 14, wherein at least one of the first action or the second action operate a control element in a control layer to manage the data object.

26. The method of claim 14, wherein at least one of the first action or the second action comprises at least one of: periodic backups of the data object, archiving of the data object, periodic taking of snapshots of the data object, automated data object deletion, periodic incremental replication, tiering, processing of the data object, or transforming the data object or the one or more features into a new form.

27. The method of claim 14, wherein the data management relates to synchronization or replication of the data object and the policy relates synchronization actions to the one or more features of the data object.

28. The method of claim 14, wherein the data management relates to backup or archiving or taking snapshots of the data object and the policy relates backup or archiving or snapshot actions to the one or more features of the data object.

29. The method of claim 14, wherein the data management relates to storage of the data object in a flexible storage hierarchy and the policy relates hierarchy levels to the one or more features of the data object.

30. The method of claim 14, wherein the policy belongs to a policy hierarchy, wherein a plurality of policies apply to the data object and wherein conflicting actions of the plurality of policies are resolved based on the hierarchy.

31. The method of claim 14, wherein the data management is carried out using a plurality of data control and processing elements scattered locally or globally, the plurality of data control and processing elements dividing a data name space among them so that each data control element processes a specific portion of the data object.

32. The method of claim 14, wherein the data management is carried out using a plurality of data control and processing elements scattered locally or globally, the plurality of data control and processing elements dividing a plurality of data sources among them so that each data control element processes a specific portion of the data object.

33. The method of claim 14, wherein data containers are provided for logical arrangement of the data object, according to at least one of a policy or a tenant, wherein each data container is sub-divided into slices, which slices are stored on local or shared storage resources and are replicatable to multiple locations.

34. The method of claim 32, comprising a layer of control elements above the processing elements, to distribute the policy in a consistent manner between the processing elements.

35. The method of claim 14, wherein at least one of the first action or the second action involves setting a common semantic attribute for association with the data object.

36. A non-transitory computer readable medium having instructions stored thereon that, when executed by a processing device, cause the processing device to perform operations comprising:

identifying a data object having one or more features and an associated policy that defines a sequence of actions that provide data management for the data object based on the one or more features;

obtaining the one or more features of the data object using a common semantic with respect to which attributes associated with the data object are mapped;

applying (a) a first action from the sequence of actions to the data object based on the policy and according to the one or more features of the data object, wherein the first action sets a common semantic attribute associated with the object for use in subsequent operations, and (b) a second action from the sequence of actions to the data object based on the policy and according to the one or more features of the data object, wherein the policy further comprises an action to update one or more attributes of the data object; and managing the data object according to the policy and the one or more features, wherein managing the data object comprises providing an output with respect to the data object.

37. The non-transitory computer readable medium of claim 36, wherein the policy is defined according to one or more operations of the data objects.

* * * * *